United States Patent
Daley, III (10) Patent No.: US 8,605,415 B2
(45) Date of Patent: *Dec. 10, 2013

(54) BAG COMPUTER DISPLAY PANEL SUPPORT ASSEMBLY

(76) Inventor: Charles A. Daley, III, Rawai (TH)

(*) Notice: Subject to any disclaimer, the term of this patent is extended or adjusted under 35 U.S.C. 154(b) by 329 days.

This patent is subject to a terminal disclaimer.

(21) Appl. No.: 12/927,884

(22) Filed: Nov. 30, 2010

(65) Prior Publication Data

US 2011/0164366 A1 Jul. 7, 2011

Related U.S. Application Data

(60) Provisional application No. 61/335,126, filed on Jan. 4, 2010.

(51) Int. Cl.
*G06F 1/16* (2006.01)

(52) U.S. Cl.
USPC .................................... 361/679.03

(58) Field of Classification Search
None
See application file for complete search history.

(56) References Cited

U.S. PATENT DOCUMENTS

| | | | | |
|---|---|---|---|---|
| 5,887,723 A * | 3/1999 | Myles et al. | ........... | 206/760 |
| 5,887,777 A * | 3/1999 | Myles et al. | ........... | 224/578 |
| 6,167,413 A * | 12/2000 | Daley, III | ........... | 708/139 |
| 6,283,299 B1 * | 9/2001 | Lee | ........... | 206/760 |
| 6,956,614 B1 * | 10/2005 | Quintana et al. | ........... | 348/373 |
| 6,962,277 B2 * | 11/2005 | Quintana et al. | ........... | 224/262 |
| 7,265,970 B2 * | 9/2007 | Jordan | ........... | 361/679.27 |
| 7,821,779 B2 * | 10/2010 | Daley, III | ........... | 361/679.02 |
| 7,876,558 B2 * | 1/2011 | Daley, III | ........... | 361/679.55 |
| 7,881,048 B2 * | 2/2011 | Daley, III | ........... | 361/679.03 |
| 7,889,496 B2 * | 2/2011 | Daley, III | ........... | 361/679.55 |
| 7,894,179 B2 * | 2/2011 | Daley, III | ........... | 361/679.03 |
| 7,974,081 B2 * | 7/2011 | Daley, III | ........... | 361/679.03 |
| 7,978,464 B2 * | 7/2011 | Daley, III | ........... | 361/679.02 |
| 8,014,138 B2 * | 9/2011 | Daley, III | ........... | 361/679.03 |
| 8,094,440 B2 * | 1/2012 | Daley, III | ........... | 361/679.03 |
| 8,125,770 B2 * | 2/2012 | Daley, III | ........... | 361/679.03 |
| 8,194,398 B2 * | 6/2012 | Daley, III | ........... | 361/679.03 |
| 2006/0113203 A1 * | 6/2006 | Daley | ........... | 206/320 |
| 2006/0113213 A1 * | 6/2006 | Daley, III | ........... | 206/576 |
| 2006/0163303 A1 * | 7/2006 | Trutanich | ........... | 224/576 |
| 2007/0199844 A1 * | 8/2007 | Daley, III | ........... | 206/320 |
| 2007/0201201 A1 * | 8/2007 | Daley, III | ........... | 361/683 |
| 2008/0192421 A1 * | 8/2008 | Daley | ........... | 361/681 |
| 2008/0273298 A1 * | 11/2008 | Daley | ........... | 361/683 |
| 2009/0009476 A1 * | 1/2009 | Daley, III | ........... | 345/168 |
| 2009/0009938 A1 * | 1/2009 | Daley, III | ........... | 361/680 |
| 2009/0046416 A1 * | 2/2009 | Daley, III | ........... | 361/679.55 |
| 2009/0107877 A1 * | 4/2009 | Daley, III | ........... | 206/576 |
| 2009/0107878 A1 * | 4/2009 | Daley, III | ........... | 206/576 |
| 2009/0141446 A1 * | 6/2009 | Daley, III | ........... | 361/679.55 |

(Continued)

*Primary Examiner* — Lisa Lea Edmonds (57) ABSTRACT

Disclosed is a pivoting computer equipment mount (PCEM) designed to pivotally hold a display panel to the outside of the bag. In particular, the PCEM is able to temporarily hold various angular positions relative to the bag front without the operator using his hands. The PCEM includes a free section which suspends the display panel while an extension of the display panel toward the bag front acts as a lever to hold the display panel in a desired angular position. The free section may be made of flexible fabric or may be rigid with hinged connections to the bag and to the display panel. There may be one sheet-like free section or there may be column-like free sections to the right and left of the display panel connection to the bag. In this latter case, the extension of the display panel may be eliminated.

39 Claims, 9 Drawing Sheets

(56) References Cited

U.S. PATENT DOCUMENTS

| | | | |
|---|---|---|---|
| 2009/0185342 A1* | 7/2009 | Daley, III | 361/679.27 |
| 2009/0190296 A1* | 7/2009 | Daley, III | 361/679.27 |
| 2009/0201637 A1* | 8/2009 | Daley, III | 361/679.29 |
| 2009/0225508 A1* | 9/2009 | Daley, III | 361/679.27 |
| 2009/0225509 A1* | 9/2009 | Daley, III | 361/679.29 |
| 2009/0236247 A1* | 9/2009 | Daley, III | 206/320 |
| 2009/0284908 A1* | 11/2009 | Daley, III | 361/679.17 |
| 2010/0193384 A1* | 8/2010 | Daley, III | 206/320 |
| 2010/0219221 A1* | 9/2010 | Zheng | 224/576 |
| 2010/0220434 A1* | 9/2010 | Daley, III | 361/679.27 |
| 2011/0032669 A1* | 2/2011 | Daley, III | 361/679.03 |
| 2011/0051349 A1* | 3/2011 | Daley, III | 361/679.27 |
| 2011/0051362 A1* | 3/2011 | Daley, III | 361/679.55 |
| 2011/0102992 A1* | 5/2011 | Daley, III | 361/679.03 |
| 2011/0267754 A1* | 11/2011 | Daley, III | 361/679.03 |
| 2011/0304965 A1* | 12/2011 | Daley, III | 361/679.03 |
| 2011/0304970 A1* | 12/2011 | Daley, III | 361/679.26 |
| 2012/0008261 A1* | 1/2012 | Daley, III | 361/679.01 |
| 2012/0106055 A1* | 5/2012 | Daley, III | 361/679.03 |
| 2012/0275102 A1* | 11/2012 | Daley, III | 361/679.03 |

* cited by examiner

BAG COMPUTER DISPLAY PANEL SUPPORT ASSEMBLY

CROSS-REFERENCE TO RELATED APPLICATIONS

This application claims the filing benefit under 35 U.S.C. §119(e) of U.S. Provisional Application No. 61/335,126, filed on Jan. 4, 2010, the entire teachings of which are incorporated herein by reference.

TECHNICAL FIELD

The present invention relates to a computer designed for mobile use.

BACKGROUND OF THE INVENTION

The use of computers has become widespread and computers have replaced may other forms of communication and information storage and retrieval. Access to computers, even while moving about, has become essential to modern life.

Standardization in computer software and some computer components has become important so that computer operation needn't be relearned in every situation. Thus, the standards on a desk top computer are also desired in the mobile environment.

Several obstacles exist in current equipment for the use of mobile computing: Small displays not capable of standard Windows operating systems: Small keyboards not capable of two hand typing: Small computer bodies and surfaces not capable of servicing the necessary computing ability and input/output electrical connections.

There has been some attempt to miniaturize lap top computers but these attempts are limited by necessary display and keyboard size and, in any case, these computers remain essentially made for use on a table top. A separate carrying case or bag must be used, set up time limits usefulness and separate components can be dropped or left behind.

The bag computer attempts to solve these problems by mounting computer components on a special bag. The following US patent applications have addressed the design of bag computers:

| publication # | application # |
| --- | --- |
| 20070201201 | 11/796,920 |
| 20070199844 | 11/799,011 |
| 20090009476 | 12/004,637 |
| 20090009938 | 12/074,115 |
| 20090046416 | 12/216,650 |
| 20080273298 | 12/216,651 |
| 20080192421 | 12/079,753 |
| 20090185342 | 12/383,784 |
| 20090190296 | 12/384,419 |
| 20090141446 | 12/322,282 |
| 20090201637 | 12/384,952 |
| 20090225509 | 12/387,594 |
| 20090225508 | 12/454,327 |
|  | 12/458,917 |
|  | 12/584,304 |

Further improvements on the bag computer and its components can be made. For example, the pivoting computer equipment mount used to attach the display panel to the bag may be simplified into a flexible fabric hinge. This improvement, in turn, invited a means to hold a display panel using this means of attachment in various angles relative to the bag front without the operator using his hands.

One way to doing this is the display panel prop (Ser. No. 12/384,952). The current application addresses an alternative means of holding an angular position of the display panel without using the hands.

BRIEF DESCRIPTION OF THE INVENTION

A bag computer is a bag including a display panel pivotally attached to the bag so that the display can store on the bag front when not in use. The display panel is positioned near the top front of the bag so it is as close as possible to the wearer/operator of the bag and may be removable from the bag using a pivoting computer equipment mount (PCEM). The bag computer may also includes a display panel cover pivoting near the bottom of the bag front computer equipment storage area, a computing unit panel attached to the inside or outside of the bag's front wall, removable keyboard or other input device.

One means of pivotally attaching the display panel to the bag is to use a flexible fabric PCEM, for example a short flap of bag material, also called an attachment flap. This provides simplicity and durability. The disadvantage of such a PCEM is that it will not, on its own, support itself in various angular positions relative to the bag front. One way of solving this problem is the use of a display panel support assembly to hold the display panel's angular position.

In a first embodiment of the display panel support assembly, a flexible fabric attachment flap is fixed to the bag near the top front of the bag. The attachment flap is divided along a horizontal into a free section and a distal section. The distal section may be adapted to attach to the display panel near its attachment edge, the display panel edge closest to the bag.

The free section acts to suspend the display panel during operation. The display panel has an extension from its attachment edge toward the bag front. While the attachment flap free section suspends the display panel, the extension pushed against and grips the bag front acting as a lever to hold the remainder of the display panel at any desired angle.

The free section may be one piece connecting the entire attachment edge of the display panel to the bag. Alternatively, the free section may be in one or more parts, for example near the right and left side edges of the display panel.

The extension may be on the same plane as the display panel or may be angled relative to the display panel plane. The angling may assist in holding the display panel in the storage position and in specific angular positions and may be used to form a gap between the display panel and bag front, for example to allow storage of a display panel prop.

An angled extension may also be used as a venue to locating display panel prop holders adapted to use a prop between the display panel and bag front to hold the display panel in operating positions, including vertical.

The end of the extension in contact with the bag front may be adapted to grip the bag front. The bag front, in turn, may have a contact surface adapted to grip the extension end for better operation of the display panel support assembly.

In another embodiment, the free section of the flexible fabric attachment flap may be replaced by a rigid tensile column with pivoting attachments attaching it to the bag and to the display panel.

The tensile column may be sheet-like simulating the attachment flap free section and two hinges may simulate the parts of the attachment flap next to the bag and display panel that bend during display panel pivoting.

The sheet-like free section may be replaced by bar-like tensile column free sections near the right edge and left edge of the display panel. The columns may be made of rigid wire bent to form both the free sections and the axles of the hinges. The bag hinge journal may be made of rigid material or a loop of bag material. The display panel journals may be sockets in the display panel near its right and left edges.

If right and left tensile column free sections are used, no part of the free section is blocking the view of the display on the display panel. In this case, the display panel extension may be left out with the display panel attachment edge abutting the bag front wall when in operation. The attachment edge may be adapted to grip the bag front or a contact surface on the bag front.

BRIEF DESCRIPTION OF THE SEVERAL VIEWS OF THE DRAWINGS

FIG. 7B This is a magnified view of the attachment flap with display panel attachment aid features.

FIG. 7C This is a magnified view of the attachment flap with display panel attachment aid features.

FIG. 7D This is a magnified view of the display panel clamp with display panel attachment aid features.

FIG. 8A This is the bag computer adapted to use the display panel support assembly. The display panel is attached to the bag and is in an operating position perpendicular to the bag front wall.

FIG. 8B This is a magnified view of the display panel pivoting computer equipment mount area showing the parts of the display panel support assembly.

FIG. 24A This is the bag computer with the display panel in operating position using a rigid free section in a sheet-like form.

FIG. 24B This is a magnified view of the pivoting computer equipment mount area showing details of the display panel support assembly where the rigid free section is sheet-like.

FIG. 25A The bag computer with the display panel is shown in operating position using a right and a left rigid free section in bar-like form.

FIG. 25B This is a magnified view of the pivoting computer equipment mount area showing details of the display panel support assembly where free section is in bar-like form.

DETAILED DESCRIPTION OF THE INVENTION

A bag computer is a bag with a display panel, including input/output devices such as a display and graphic user input device, mounted to the exterior of the bag so it may pivot on an axis parallel to the junction of the bag's top and front walls from a storage position parallel to and adjacent the bag's front wall to an operating position away from the bag's front wall where the wearer/operator may view it. The bag computer's computing unit may be found in the display panel or elsewhere mounted to the bag's interior or exterior and is electrically connected to the display panel. The bag computer may be seen as a system of components to facility the mobile use of a computer.

Figure 1:
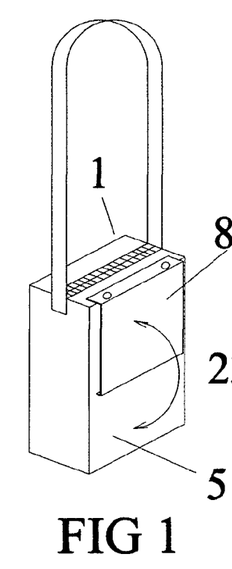
FIG. 1 The bag computer is show with the display panel stored and the cover closed.
Figure 2:
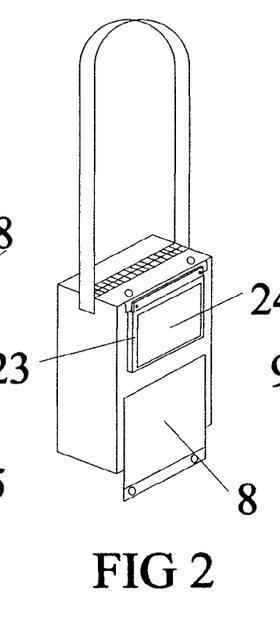
FIG. 2 The bag computer is show with the cover open and the display panel in stored position.
Figure 3:
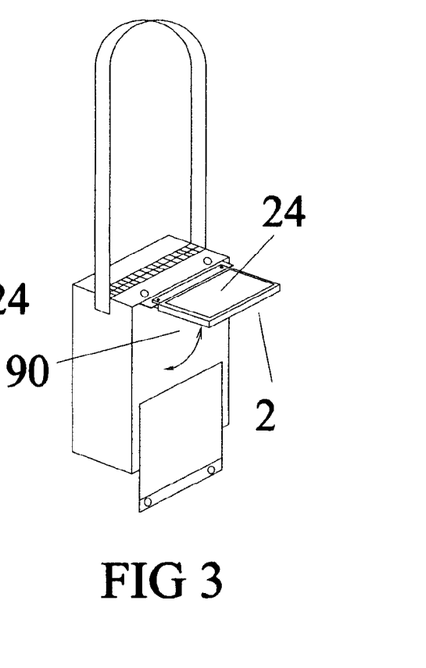
FIG. 3 The bag computer is show with the cover open and the display panel in an operating position approximately perpendicular to the bag's front wall.

FIGS. 1, 2 and 3 show how a bag computer is deployed and used. As shown in FIG. 1 the display panel, when mounted to the bag 1, is stored against outside of the bag front wall 5 and may be covered with a cover 8, such as a cover flap or rigid shaped cover. Shown in FIG. 2, when the cover 8 is repositioned by pivoting down, the display panel 2 is exposed for use. Here it can be seen that the display panel 2 is in storage position with its front side 23, including display 24, and back side approximately parallel to the bag front wall exterior 5 and its back side adjacent to the exterior of the bag front wall. The display faces away from the bag front wall. In FIG. 3, the display panel 2 is pivoted to an operating position out of and away from the computer equipment storage area 90 on the outside surface of the front wall of the bag. The display 24 is now facing up and properly oriented in the line of sight of the operator/bag wearer so the display can be viewed and used. The display panel may include controls and these may include a touch screen 24. The back side of the display panel may also have controls for operating the computer. The display panel may pivot freely because the display panel prop is shown attached to the bag's front wall ready for use but not yet engaged to the display panel.

Figure 4A:
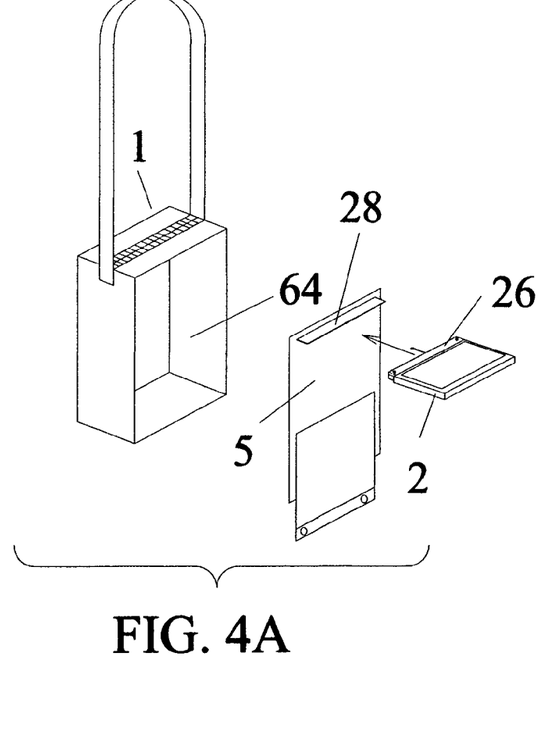
FIG. 4A This is an exploded view of the bag computer with the front wall and the display panel removed.

Shown in FIG. 4A, an exploded view with the bag's front wall 5 removed to show the interior 64 of the bag 1, the display panel 2 may be removable from the bag. The bag and display panel may be pivotally joined with complimentary mounting attachments on the bag and display panel, also collectively known as "pivoting computer equipment mounts" (PCEM). There is a bag part PCEM 28, and complimentary attachment called a display panel part PCEM 26. The character and number of the PCEM parts may vary while still serving the same purpose to pivotally attach the bag and display panel together.

Figure 4B:
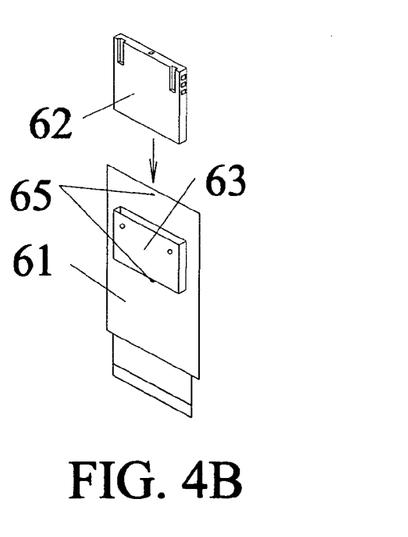
FIG. 4B This is a view of the inside surface of the bag's front wall.

The bag front wall has an outside surface 5 and, shown in FIG. 4B and inside surface 61. The inside surface may have a mounting structure 63 for holding a computing unit panel 62 to the inside surface of the bag's front wall. The front wall may also have one or more electrical access openings 65 to provide a conduit to pass an electrical connection from electrical equipment mounted to the outside of the bag to peripherals, batteries or the computing unit panel on the interior of the bag.

Figures 5, 6A:
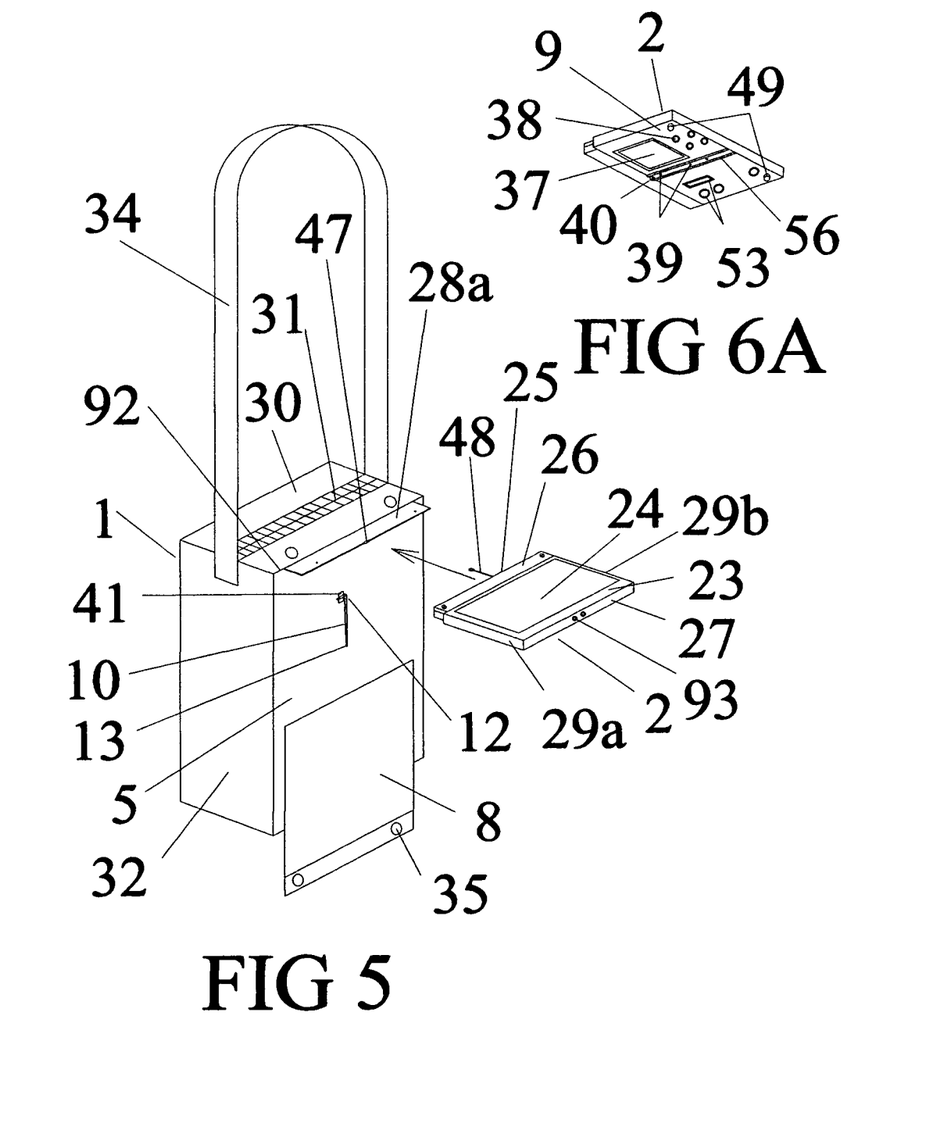
FIG. 5 This is the bag computer with the display panel removed. The important parts are pointed out.
FIG. 6A This is a view of the back side of the display panel including controls.

As shown in FIG. 5, one or more bag part PCEMs, in this case shown as an short flexible fabric attachment flap 28a, are found on the bag 1 and one or more complimentary display panel part PCEMs, in this case shown as a matching clamp 26a, are found on the display panel. The pivoting part of the PCEM may be part of the bag part PCEM or part of the display panel part PCEM or part of both. The PCEM leaves the back side of the display panel unobstructed so controls located there can be used.

The bag is comprised of a front wall 5, top wall 30 with opening with optional closure to gain access to the bag's interior, a bottom wall, side walls 32 and a back wall. There may be an opening 31 in the bag's top wall to access the interior of the bag and this may be closable with, for example, a zipper. The bag has a strap 34 for the operator/wearer to carry the bag for transport and to suspend or secure the bag on, for example, the operator's/wearer's shoulder, torso or waist while leaving the hands free for using the computer attached to the bag. The bag mounting attachments 28 to match the display panel mounting attachments may be found near the junction 92 of the bag's top wall and front wall so the display panel and display may be positioned as close as possible to the operator/wearer's eyes when pivoted out into the line of sight of the operator for use. For example, the bag mounting attachment may be located on the bag's front wall proximal to the top wall, may be an extension of the bag's top wall over the front wall or may be attached to the bag's side walls as long as they allow the attached display panel to rest parallel to and approximately adjacent to the bag front wall for storage or pivot on an axis approximately parallel to the junction of the top and front bag walls to an operating position in the line of sight of the operator/wearer for use.

The bag may have a cover, such as a cover flap 8 or rigid shaped cover, to cover, conceal, protect and secure the display panel in its storage place while on the bag front wall. The cover flap may be permanently and pivotally attached, for example by sewing or riveting, to the bag front wall near its center. In this position the cover flap may be pivoted on a horizontal axis up and over the display panel while in storage position next to the bag front wall and having fasteners 35 near the distal edge of the cover to close the cover to matching fasteners on the top of the front wall or front of the top walls. The cover may be rigid or semi-rigid and be shaped or molded to fit the display panel.

Alternatively, the cover may be permanently and pivotally attached to the top of the back wall, to the top wall or to the top of the front wall and fold down over the bag front wall and display panel stored there.

If the display panel has an electrical connection 48 leading to a computing unit, batteries or other electrical equipment found in the interior of the bag or mounted to the inside surface of the front wall, the bag's attachment flap 28*a* may be constructed of two layers including an electrical access through opening 47 leading through the flap and front wall to facilitate electrical communication between the display panel and electrical equipment inside the bag.

The exterior of the bag front wall 5 may have one or more prop holders 41, such as a socket, pins, sewn on loop, metal or plastic bearing or other receiver, holder or attachment to match and be complimentary to the prop 10 first end 12. The prop holder may hold the prop semi-permanently and pivotally to the bag front wall or to the display panel back side so that it may be ready to attach its opposite prop second end 13 and span between the display panel and bag front and support the display panel at one or more angles relative to the bag front wall. The area on the bag front around the prop holder may be reinforced, for example with redoubled material or with heavier material, so that the bag front material does not bend under the weight of the display panel against the prop and bag front. In the case where a computing unit is mounted to the inside of the bag's front wall, the computing unit's body may be positioned to support the prop holder.

The bag may have provision to mount a manual character input device, such as a keyboard or electronic write pad, to the inside of the cover or to a separate pivoting computer equipment mount located on the bag front.

The bag may have further mounting structures on the interior or exterior of the bag to install and hold batteries, peripherals, computing unit, communication equipment or other computing equipment to the bag where is may be electrically connected and used in conjunction with the display panel. The mounting structure may be located on the inside of the bag's front wall so as to leave the majority of the bag's interior vacant and available for miscellaneous cargo and/or peripherals.

The PCEM hinge means may be capable of holding the angular position between the display panel and bag front wall with, for example, a ratchet or friction hinge. Instead, as in the case where the PCEM hinge means is a flexible fabric flap, the angular position between the display panel and bag front wall may be maintained using a display panel prop assembly designed to extending between the bag front wall and display panel back side and temporarily support the display panel in one or more viewing positions. The display panel may include an electrical connection 48 to connect the display panel to interior stored or mounted peripherals, batteries, computing unit or other computing equipment. The display panel may include a camera 93 and/or infrared communicator and this may be located near the distal edge of the display panel.

Because the display panel and bag have different life times, the display panel and bag may be separated for replacement or upgrading. The display panel 2 is of panel-like shape having front side 23 with display 24, an opposite back side which may have controls, an attachment edge 25 closest to the bag, a distal edge 27 opposite the attachment edge and a right side edge 29*a* and a left side edge 29*b*. On or near the attachment edge there may be one or more display panel mounting attachments 26 which are the display panel portion of the PCEM and are complimentary to bag mounting attachments located on the bag and pivotally connect the bag and display panel.

FIG. 6A shows the back side 9 of the display panel 2 where controls may be found and be available for use when the operator holds the display panel while using it while attached to the bag. These controls may include a pointing device, one or more touch pads 37, clickers, buttons 38, slides or other means to communicate with the computing unit with the hands.

The back side of the display panel may have one or more prop holders, such as holes, sockets 39, clips 40, sliding fixtures, guides, runway, pins, or hinge means with mount to match and be complimentary to a display panel's prop end and used to support the display panel at one or more angles relative to the bag front wall.

There may be several display panel back side prop holders properly spaced and angled to prop up the display panel in the most commonly used positions. Different types of holders may be used to accommodate holding the display panel at various semi-horizontal angles versus holding the display panel vertical and parallel to the bag front and prop. The prop holders may be partially or wholly inset into the display body and/or attachment on the attachment edge of the display panel. There may be molded-in prop position guides 56 to help the fingers engage the prop end into the right prop position on the back of the display with the hands without looking. The display panel may have a means of spacing the display panel back from the bag front, such as display panel edges extended toward the bag front beyond the plane of the display panel back side, legs, bumpers 49 or display panel mounting attachment extending toward the bag front from the display panel back side or a recessed area in the display panel back side to matching the prop holders and prop, so that the display panel, when in storage position, may lay approximately flat against the bag without interference from the display panel prop assembly.

Figure 6B:
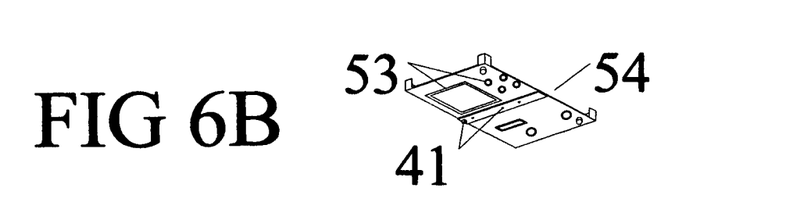
FIG. 6B This is a template with finger guides, prop holders and other features made to cover the back side of the display panel FIG. 7A This is the bag computer adapted to use the display panel support assembly. The display panel is removed from the bag.

The display panel back side may include finger guides 53 around or near specific controls to assist in finding these controls without looking. The finger guides may be in the form of molded in ridges around or near controls. As shown in FIG. 6B, a removable template 54 or frame with tactile finger guide 53 features may be used to indicate control positions. The template or frame may be rigid and include clips to attach it to the display panel or may be thin and attach to the display panel with adhesive or attachments that are part of the display panel. Display panel prop holders 41 may be included in a template or frame 54 which may be removable from the display panel. The finger guide and display panel prop holder may be combined on the same template or frame.

Many advantages, including durability, economy and light weight, can be gained by using a flexible fabric hinge to pivotally attach the DP to the bag. The primary disadvantage is that a flexible fabric hinge, alone, will not hold the DP in various angular positions relative to the bag front.

One way to hold angular position of the DP is to use a display panel prop. Another way is to use a DP extension in combination with a PCEM that includes a free section.

Figures 7A, 7B, 7C, 7D, 8A, 8B:
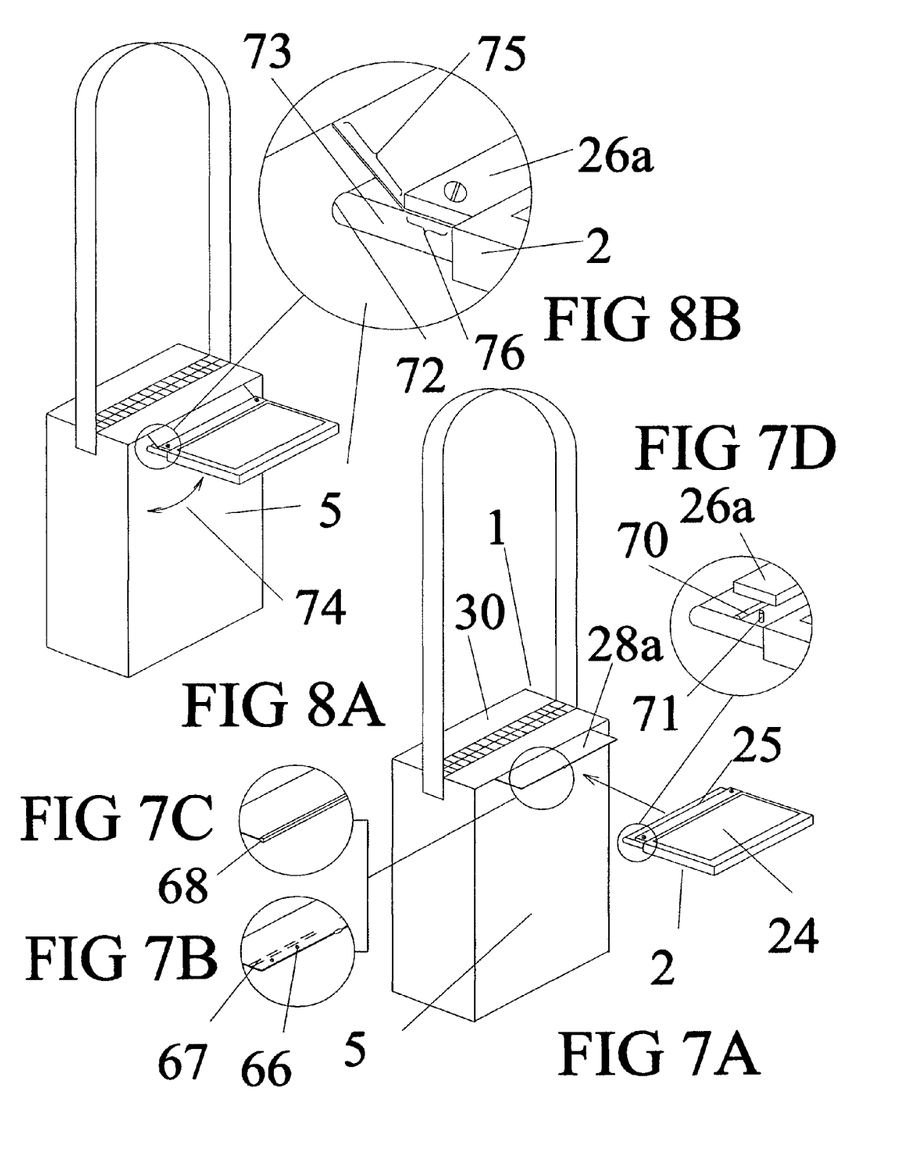

FIG. 7A shows the bag 1 and display panel 2 disconnected. The attachment flap 28a is adapted to fit a matching attachment on the attachment edge 25 of the display panel. Also shown are the bag's front wall 5, top wall 30 and the display 24 on the front side of the display panel.

FIG. 7B and FIG. 7C show that the attachment flap may have attachment aid features, such as holes 66, stitching 67, track 68, channel or edge thickening, to assist in attaching to the display panel. These may be found on or comprise the distal section of an attachment flap.

As shown in FIG. 7D, the attachment area on the display panel may have attachment aid features to match the bag's attachment flap. The attachment, for example a clamp 26a, may include ridges 70 or pins 71 to aid in securing the flap to the display panel.

FIG. 8A shows the bag and display panel attached and ready for operation. The display panel is pivoted from storage to an angular position 74 about perpendicular to the bag's front wall 5. The flexible fabric hinge, here an attachment flap, allows the display panel to pivot along a horizontal axis parallel to the display panel attachment edge.

FIG. 8B is a magnification of the display panel to bag hinge area. The attachment flap has a distal section 76 (indicated in the drawing by a brace) used for attachment to the display panel 2. It also has a free section 75 (indicated by a brace) which is used in conjunction with the display panel extension 73 to hold the display panel at various angles relative to the bag front wall. The two sections are divided along a line parallel to the display panel attachment edge. The free section connects to and extends between the bag and the display panel and acts as a tensile column to support the display panel while the extension acts as a lever with the extension end 72 abutting the bag front and temporarily gripping or adhering to the bag front wall 5 and maintaining the angular position of the display panel. The free section may pivot both at its junction with the bag and at its junction with the display panel.

Figure 9:
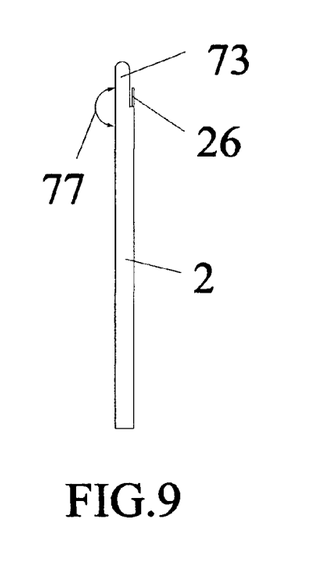
FIG. 9 This is a side view of the display panel

FIG. 9 shows the display panel 2 dismounted from the bag. The extension 73 is straight and in line with the plane of the display panel. The angle between the plane of the extension and plane of the display panel is 180 degrees 77. Near the junction of the display panel and the extension is the display panel attachment 26 matching the bag's attachment. In this case, the attachment is a clamp with one removable jaw. Attachment edge?

Figure 10A:
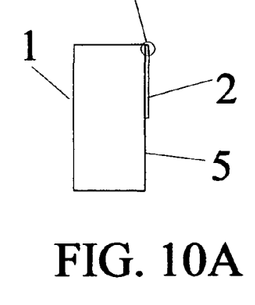
FIG. 10A This is a side view of the bag computer with the display panel in storage position adjacent to the bag's front wall.

FIG. 10A shows a side view of the bag 1 with the display panel 2 mounted to it and in the storage position adjacent to an approximately parallel to the front wall 5 of the bag.

Figure 10B:
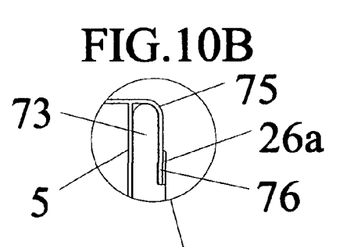
FIG. 10B This is a magnified side view of the pivoting computer equipment mount area showing details of the display panel support assembly while the display panel is in storage position.

FIG. 10B is a magnified view of the pivoting attachment area of the bag with display. When in storage position, the display panel 2 is adjacent to the front wall 5 with the extension 73 positioned under the free section 75 of the attachment flap. It can be seen that the distal section 76 of the attachment flap may be used to clamp in a display panel attachment clamp 26a.

Figure 11A:
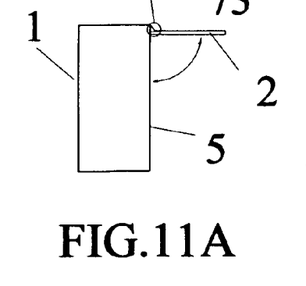
FIG. 11A This is a side view of the bag computer with the display panel in an operating position about perpendicular to the bag's front wall.

FIG. 11A shows a side view of the bag 1 with the display panel 2 mounted to it and in an operating position approximately perpendicular to the front wall 5 of the bag.

Figure 11B:
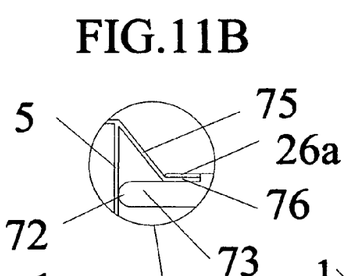
FIG. 11B This is a magnified side view of the pivoting computer equipment mount area showing details of the display panel support assembly while the display panel is in operating position about perpendicular to the bag's front wall.

FIG. 11B is a magnified view of the pivoting attachment area of the bag 1 with display panel. Here, the display panel 2 approximately perpendicular to the front wall 5. The free section 75 of the attachment flap suspends the display panel with the extension 73 end 72 positioned against the front wall 5 of the bag and holding the display panel at its angle (perpendicular to the front wall). It can be seen that the distal section 76 of the attachment flap may be used to clamp in a display panel attachment clamp 26a.

Figure 11C:
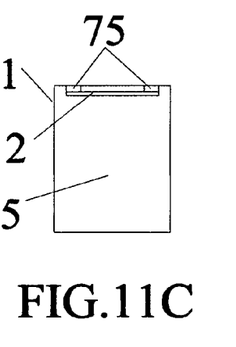
FIG. 11C This is a front view of the bag computer with the display panel in an operating position about perpendicular to the bag's front wall. Details of right and left attachment flaps are shown.

FIG. 11C, a front view of the bag 1 with the display panel 2 perpendicular to the bag front 5, shows that the free section of the attachment flap may be divided into more than one part, for example one on the left and one on the right 75.

Figure 12A:
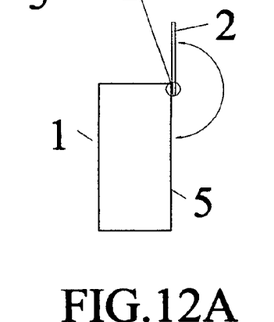
FIG. 12A This is a side view of the bag computer with the display panel in a vertical operating position about parallel to the bag's front wall.

FIG. 12A shows a side view of the bag 1 with the display panel 2 mounted to it and in an operating position approximately vertical to the front wall 5 of the bag.

Figure 12B:
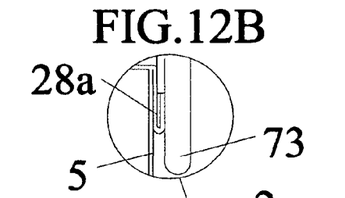
FIG. 12B This is a magnified side view of the pivoting computer equipment mount area showing details of the display panel support assembly while the display panel is in a vertical operating position about parallel to the bag's front wall.

FIG. 12B is a magnified view of the pivoting attachment area of the bag with display panel. Shown are the display panel extension 73, attachment flap 28a, and front wall 5 of the bag.

Figure 13:
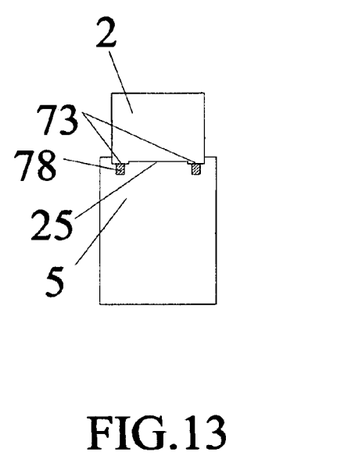
FIG. 13 This is a front view of the bag computer with the display panel in a vertical operating position about parallel to the bag's front wall. Details of the extension and contact surface are shown.

FIG. 13 shows a front view of the bag with the display panel 2 mounted to the bag and in a vertical operating position approximately parallel to the front wall 5 of the bag. There may be two or more display panel extensions 73 extending from the display panel attachment edge 25, for example, one on the right and one on the left. The bag may be adapted to be used with the display panel extension. For example, the bag front may include one or more extension contact surfaces 78 (shown hatched). A contact surface may be adapted to grip teeth, such as heavy material, webbing material. The contact surface may be adapted to match and be complimentary to some feature or attachment on the extension end, and may be or include a strip or panel with notches, holes or projections. The contact surface may be adapted to create friction as in the case of some rubbery or fuzzy materials. The contact surface may be or may be part of a rigid surface on the bag front to keep the bag front material from bunching up under the prying pressure of the extension. Such a contact surface may brace against the junction of the attachment flap and the bag front.

Figures 14A, 14B, 15A, 15B, 15C, 16A, 16B, 17:
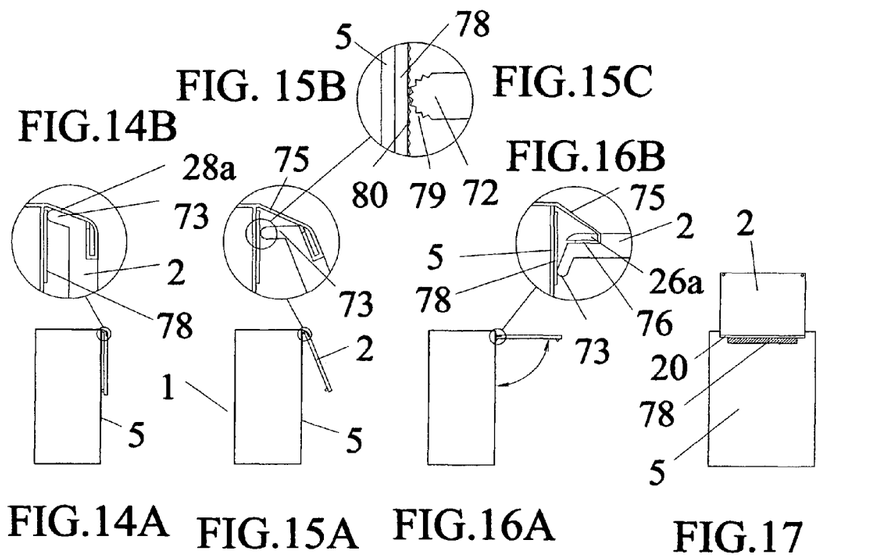
FIG. 14A This is a side view of the bag computer with the display panel including an angled extension and in storage position adjacent to the bag's front wall.
FIG. 14B This is a magnified side view of the pivoting computer equipment mount area showing details of the display panel support assembly while the display panel, including an angled extension, is in storage position.
FIG. 15A This is a side view of the bag computer with the display panel, including an angled extension, in an operating position at about 45 degrees relative to the bag's front wall.
FIG. 15B This is a magnified side view of the pivoting computer equipment mount area showing details of the display panel support assembly while the display panel, including an angled extension, is in operating position at about 45 degrees relative to the bag's front wall.
FIG. 15C This is a magnified side view of the end of the extension and matching contact surface on the bag front.
FIG. 16A This is a side view of the bag computer with the display panel, including an angled extension, in an operating position about perpendicular to the bag's front wall.
FIG. 16B This is a magnified side view of the pivoting computer equipment mount area showing details of the display panel support assembly while the display panel, including an angled extension, is in operating position about perpendicular to the bag's front wall.
FIG. 17 This is a front view of the bag computer with the display panel in a vertical operating position about parallel to the bag's front wall. Details of the extension and contact surface are shown.

Side views FIG. 14A and FIG. 14B show that the display panel 2 extension 73 can be angled relative to the display panel plane and positioned below the attachment flap 26a when the display panel is in storage position adjacent to and parallel to the front wall 5 of the bag. The contact surface 78 for the extension is positioned to be able to contact the extension end in any position it may be in.

Side view FIG. 15A shows the display panel 2 pivoted to a position about 45 degrees relative to the front wall 5 of the bag. Magnified in FIG. 15B, the attachment flap free section 75 has now moved away from the extension 73. Again magnified in FIG. 15C, the extension end 72 may include a extension end gripping feature 79 adapted to temporarily grip or adhere to the bag front 5. If a contact surface 78 is included, it may include a contact surface gripping feature 80 adapted to temporarily grip or adhere to the end of the extension.

Side views FIG. 16A and FIG. 16B show the display panel in a position approximately perpendicular to the bag front. The end of the extension 73 is still in contact with the contact surface 78 mounted on the front wall 5 of the bag. The free section 75 of the attachment flap is suspending the display panel to hold it in a desired angle while the attachment flap distal section 76 is attached to the display panel 2 with an attachment clamp 26a.

FIG. 17 is a front view of the bag showing the bag front wall 5 with the display panel 2 is a vertical position. There may be a contact surface 78 (shown hatched) on the bag front wall to assist in temporarily holding the display panel extension 73 to the bag front and maintain a display panel angular position.

Figures 18A, 18B, 18C, 18D, 19, 20A, 20B:
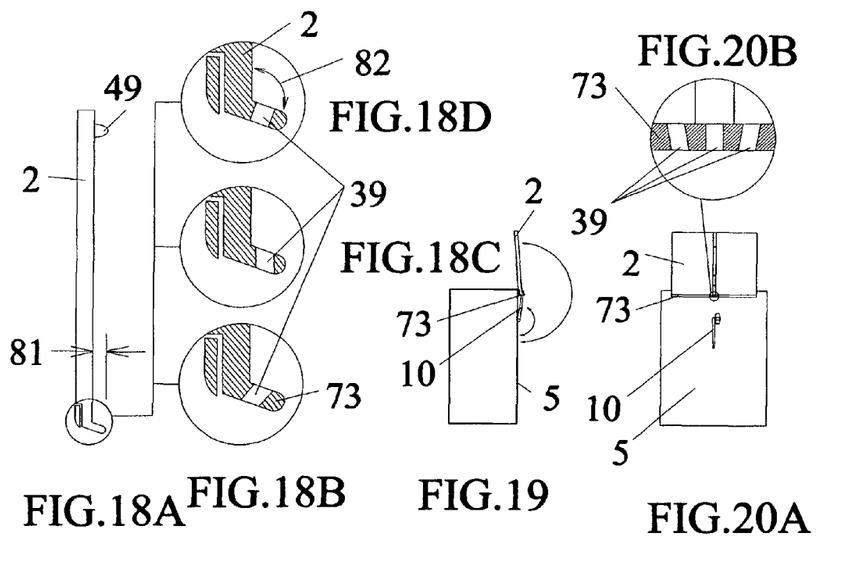
FIG. 18A This is a side view of the display panel
FIG. 18B This is a magnified cross section side view of the display panel angled extension area showing a form of prop holder.
FIG. 18C This is a magnified cross section side view of the display panel angled extension area showing a form of prop holder.
FIG. 18D This is a magnified cross section side view of the display panel angled extension area showing a form of prop holder.
FIG. 19 This is a side view of the bag computer with the display panel, including angled extension, in a vertical operating position parallel to the bag's front wall. Details of the display panel prop and holder are shown.
FIG. 20A This is a front view of the bag computer with the display panel in a vertical operating position about parallel to the bag's front wall. Details of the extension and display panel prop and holder are shown.
FIG. 20B This is a magnified cross section front view of the display panel angled extension area showing an arrangement of prop holders.

FIG. 18A shows a side view of the display panel 2 having an angled extension. The angle may create a gap 81 between the display panel and the front wall of the bag. The display panel may also have bumpers 49 to maintain this gap which may be useful in allowing storage area on the bag front for a display panel prop. FIG. 18B, FIG. 18C and FIG. 18D are magnifications of cross sections (shown hatched) of the end of the display panel 2 with the angled extension 73. The angle between the plane of the extension and the plane of the display panel may be fixed at any useful angle 82. The cross sections also show prop holders 39, in this case holes, for matching and holding a display panel prop to the display panel. This holder may be located on or through the extension 73. The extension provides an accessible place to attaching the prop to the display panel for positioning the display panel in the vertical position. The different figures show that the angle of the prop holder may vary to allow the operator to choose the best vertical angle for viewing the display.

FIG. 19 is a side view of the bag with the display panel 2 in the vertical position and supported by a prop 10 located on the front wall 5 and spanning between the display panel and the bag front wall to support the display panel in an angular position relative the bag's front wall. The prop is held in a prop holder located on the display panel extension 73.

FIG. 20A and FIG. 20B, a magnified cross section view (shown hatched) of the prop holder area in the extension, show that there may be several prop holder 39 in the extension 73. This allows multiple vertical positions for the display panel 2 relative to the front wall. The prop 10 is shown on the bag front 5.

Figure 21A:
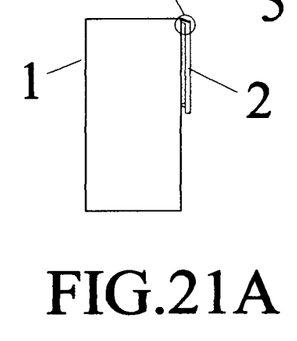
FIG. 21A This is a side view of the bag computer with the display panel, including an angled extension, in storage position adjacent to the bag's front wall. In this embodiment the free section is shown as a rigid tensile column with two hinges.

Angular position can also be maintained using the same components without using a flexible fabric attachment flap. FIG. 21A through FIG. 23B show an embodiment where a rigid material free section, of metal or plastic for example, may be adapted to pivotally attach to the bag along its edge proximal to the bag, for example with a first hinge, and to pivotally attach to the display panel along its edge distal to the bag, for example with second hinge. A tensile column, which may be rigid, may be substituted for the flexible fabric in forming the free section and pivoting attachments substitute for the bending and pivoting characteristic of the flexible fabric attachment flap. FIG. 21A and magnification FIG. 21B show a side view of the bag 1 with the display panel 2 in the stored position.

Figures 21B, 22B:
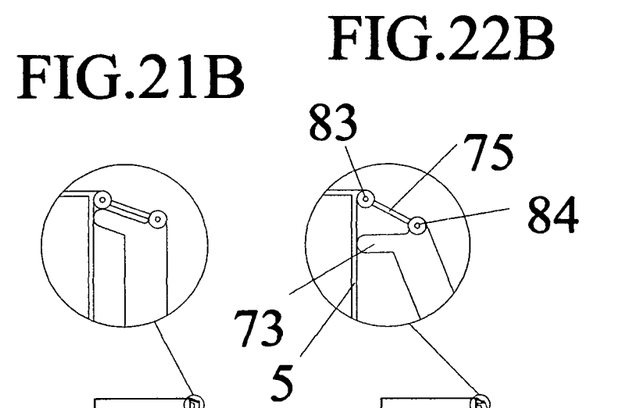
FIG. 21B This is a magnified side view of the pivoting computer equipment mount area showing details of the display panel support assembly while the display panel, including an angled extension, is in storage position. The free section is shown as a rigid tensile column with two hinges.
FIG. 22B This is a magnified side view of the pivoting computer equipment mount area showing details of the display panel support assembly while the display panel, including an angled extension, is in an operating position about 45 degrees relative to the bag's front wall. The free section is shown as a rigid tensile column with two hinges.
Figure 22A:
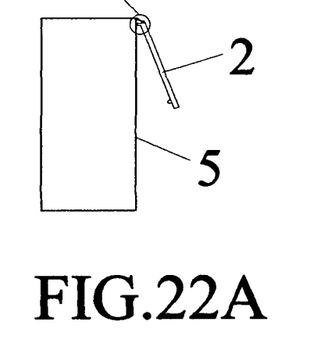
FIG. 22A This is a side view of the bag computer with the display panel, including an angled extension, in an operating position about 45 degrees relative to the bag's front wall. In this embodiment the free section is shown as a rigid tensile column with two hinges.

FIG. 22A and FIG. 22B show the display panel 2 in an operating position of about 45 degrees. Here the rigid material free section 75 tensile column with a first pivoting attachment 83, such as an axle bearing hinge or other hinge means, connecting the free section to the bag and a second pivoting attachment 84, such as an axle bearing hinge or other hinge means, connecting the free section to the display panel is shown suspending the display panel. The extension 73 is in contact with the bag front wall 5.

Figures 23A, 23B:
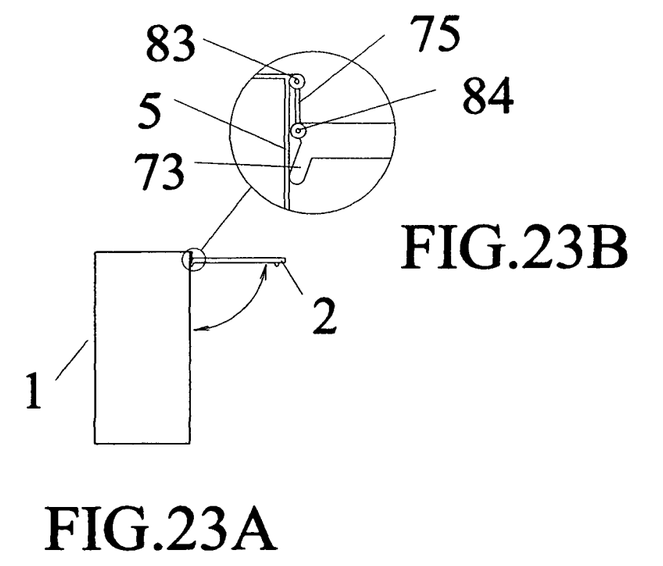
FIG. 23A This is a side view of the bag computer with the display panel, including an angled extension, in an operating position about perpendicular to the bag's front wall. In this embodiment the free section is shown as a rigid tensile column with two hinges.
FIG. 23B This is a magnified side view of the pivoting computer equipment mount area showing details of the display panel support assembly while the display panel, including an angled extension, is in an operating position about perpendicular to the bag's front wall. The free section is shown as a rigid tensile column with two hinges.

FIG. 23A and FIG. 23B, a magnification of the pivoting attachment area, again show the free section 75, the first pivoting attachment 83 and the second pivoting attachment 84. In this case, the display panel is in an operating position perpendicular to the bag front wall 5. The extension 73 is still resting against the bag front wall.

Figures 24A, 24B, 25A, 25B:
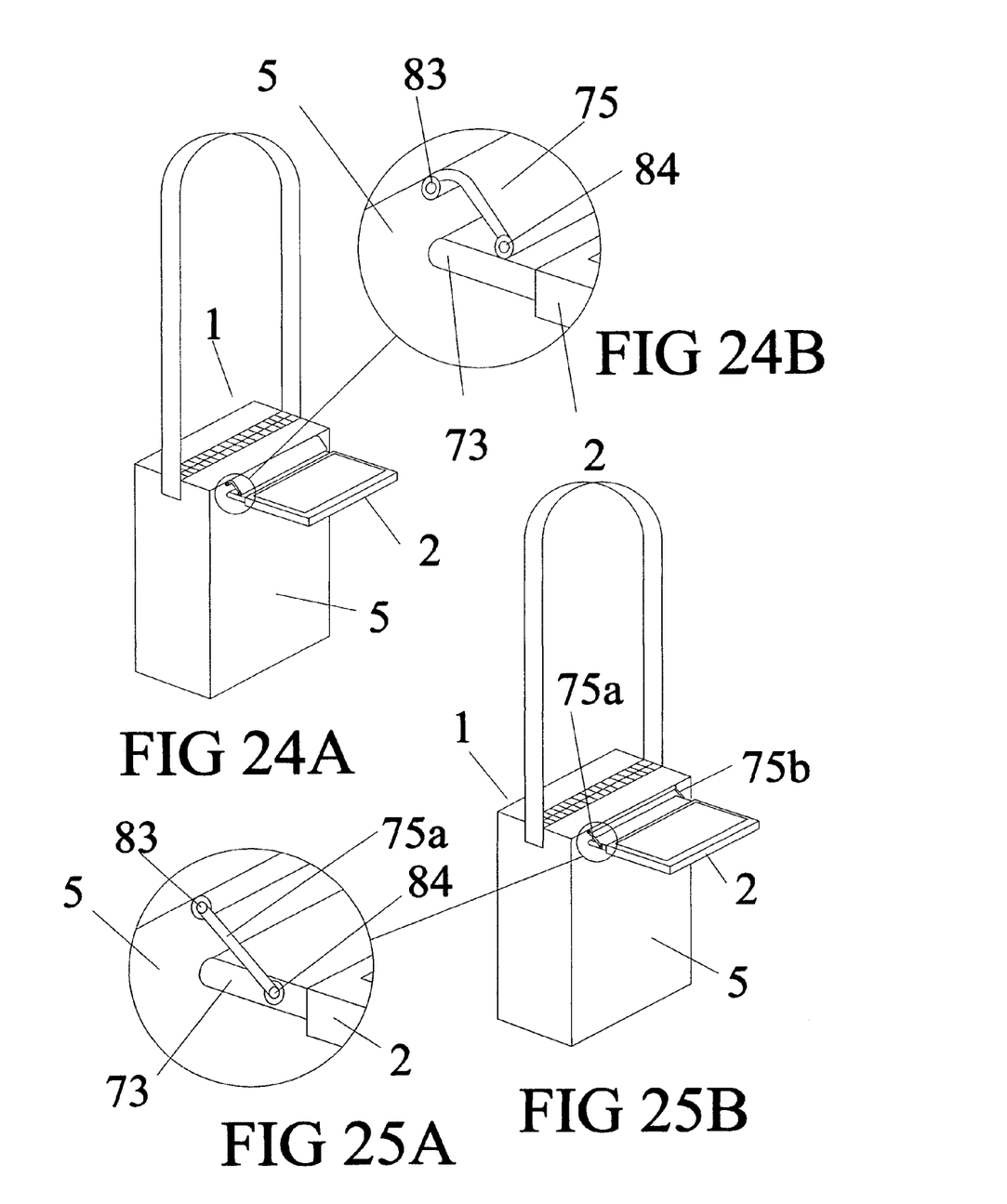

FIG. 24A and FIG. 24B show this arrangement where the free section 75 is a rigid sheet very similar to the attachment flap. The free section has a first pivoting 565 attachment 83 for pivotal attachment to the bag 1 and a second pivoting attachment 84 for pivotal attachment to the display panel 2. The pivoting attachments are shown here as hinges. The extension 73 is in contact with the front wall 5 of the bag. The rigid sheet free section may be shaped in a curve to allow movement into various angular position including into storage position.

FIG. 25A and FIG. 25B show that the free section may be divided into two or more parts, in this case a right part 75a near the right side and a left part 75b near the left side of the display panel. Further, each of the right and left parts may be reduced to a tensile column each with a first pivoting attachment 83 for pivotal attachment to the bag 1 and a second pivoting attachment 84 for pivotal attachment to the display panel 2. The display panel, then, is attached to the bag along a first axes between the right and left first pivoting attachments and a second axes between the right and left second pivoting attachments both axes approximately parallel to the junction of the bag's top and front walls. Along with the tensile column free sections, these move the extension 73 into place abutting the bag's front wall and holding the display panel in an angular position relative to the bag's front wall 5.

Figures 26A, 26B, 27A, 27B:
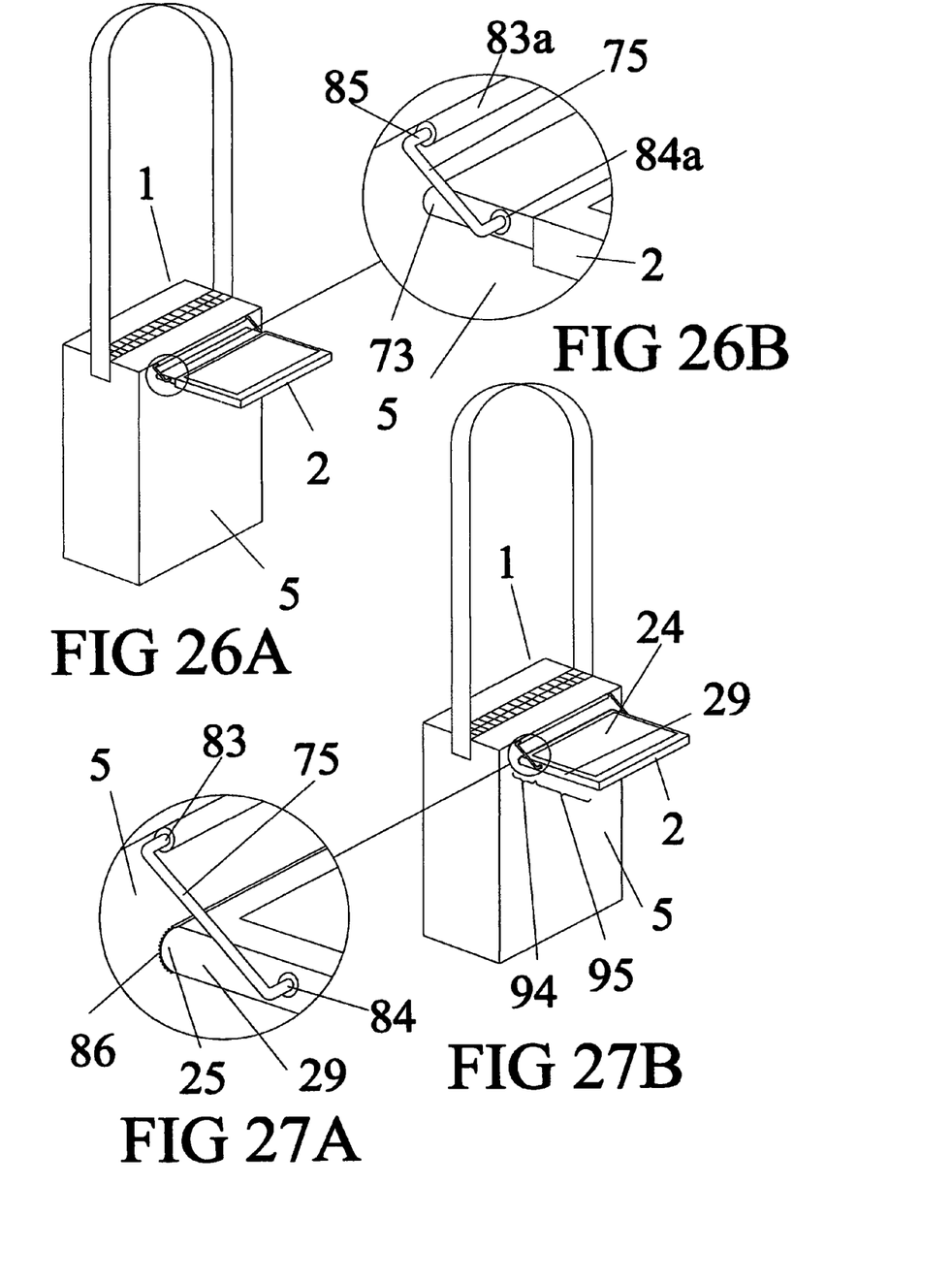
FIG. 26A The bag computer with the display panel is shown in operating position using a right and a left rigid free section in bent rigid wire form.
FIG. 26B This is a magnified view of the pivoting computer equipment mount area showing details of the display panel support assembly where free section is in a bent rigid wire form.
FIG. 27A The bag computer with the display panel is shown in operating position using a right and a left rigid free section in bent rigid wire form. The display panel has no extension.
FIG. 27B This is a magnified view of the pivoting computer equipment mount area showing details of the display panel support assembly where free section is in a bent rigid wire form. The display panel has no extension.

FIG. 26A and FIG. 26B show this same kind of arrangement but with the free sections 75, right and left, along with the axles, becoming a bent rigid wire 85 to fit one or more bag bearings 83a and one or more display panel bearings 84a. In this case, the bag's bearing may be made of bag material folded to act as a bearing and holds the bent wire. The bearing may be openable for installation of the wire. The bearings on the display panel may be sockets into which the wire ends are inserted. The extension 73 of the display panel 2 is in contact with the front wall 5 of the bag 1.

FIG. 27A and FIG. 27B show this same arrangement but without a display panel extension. Because the free section 75 tensile columns are to the right and left sides of the display panel, no part of the free section blocks the display 24. Therefore, no extension is needed. For each of the right and left free sections, the first pivoting attachment 83 connects to the bag 1 and a second pivoting attachment 84 attaches near a side edge 29 of the display panel 2. The attachment location of the tensile columns to the display panel allows a proximal portion 94 of the display panel (indicated by a brace) to extend toward the bag's front wall while the remaining distal portion 95 of the display panel (indicated by a brace) extends away from the front wall while the display panel is in an operating position approximately perpendicular to the bag front wall. A portion of the display panel, then, forms an extension which may also include a part of the display 24 on its front side. The attachment edge 25 of the display panel is in contact with the front wall 5 of the bag. In this case, the attachment edge would not include an attachment for the free section. The attachment edge may include a gripping feature 86, such as teeth, rubber or an attachment, adapted to grip the bag front wall or to match a contact surface attached to the front wall.

Figure 28A:
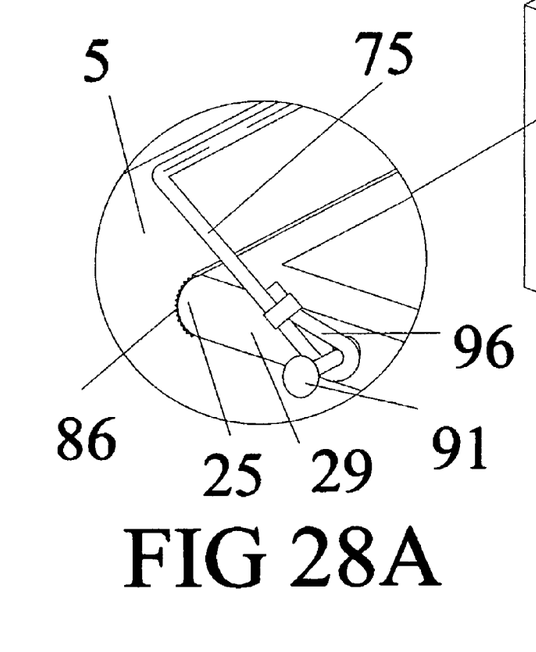
FIG. 28A The bag computer with the display panel is shown in operating position using a right and a left flexible fabric free section shown here as rope. The display panel has no extension.
Figure 28B:
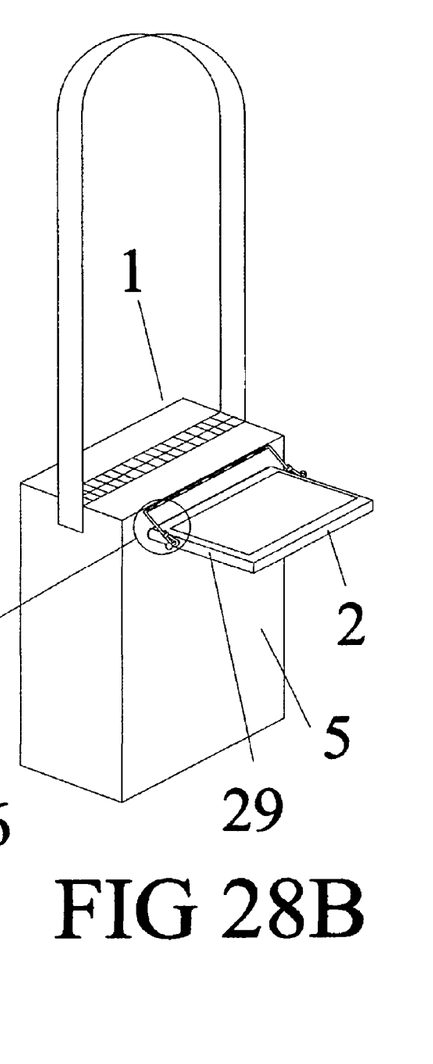
FIG. 28B This is a magnified view of the pivoting computer equipment mount area showing details of the display panel support assembly where free section is a rope with loops to attach to display panel knobs. The display panel has no extension.

FIG. 28A and FIG. 28B again show the display panel 2 without an extension. In this case the right and left free section tensile columns 75 are made of a flexible material such as rope, string, wire, cloth, leather, plastic or other flexible material attached between the bag and display panel side edge 29. Because the load is tensile, rigidity is not needed. A rope, for example, may be sewn to the bag 1 forming the equivalent of the first pivoting attachment. The attachment to the display panel, for example, may be by a loop 96 in the rope around a post 91 near a side edge 29 of the display panel or other flexible attachment which forms the equivalent of the second pivoting attachment. The attachment edge 25 of the display panel pushes against the bag front 5 and can have gripping aids 86.

The invention claimed is:

1. A display panel assembly comprising:
   a. a bag comprised of an interior and a front wall including an outside surface and an inside surface;
   b. a display panel comprising a front side including a display, a proximal portion, a back side, an attachment edge, a right side edge and a left side edge; and
   c. a pivoting computer equipment mount connecting the display panel to the bag comprised of:
   a right part free section attached to the bag at a first pivoting attachment and attached to the display panel with a second pivoting attachment and pivoting near the right side edge of the display panel and
   a left part free section attached to the bag at a first pivoting attachment and attached to the display panel with a second pivoting attachment and pivoting near the left side edge of the display panel,
   wherein the location of the pivoting of the right part free section and left part free section at the sides of the display panel defines the proximal portion of the display panel which extends toward the bag front wall and the attachment edge pushes against the outside surface of the bag front wall while the free sections suspend the display panel from the bag and hold the display panel in an operating position.

2. The display panel assembly of claim 1 wherein the right part and left part free sections are comprised of flexible material.

3. The display panel assembly of claim 1 wherein the right part and left part free sections are comprised of rigid material.

4. The display panel assembly of claim 1 wherein the display panel is further comprised of a prop holder, the prop holder matching a prop located between the display panel and the bag front wall and supporting the display panel in an angular position relative to the front wall of the bag.

5. The display panel assembly of claim 1 wherein the bag front wall is further comprised of a contact surface, the contact surface configured to aid in temporarily adhering the attachment edge to the bag front wall.

6. The display panel assembly of claim 1 wherein the display panel is further comprised of camera.

7. The display panel assembly of claim 1 wherein the display panel is further comprised of a control.

8. The display panel assembly of claim 7 wherein the control is one of a touch screen on the display and a control located on the back side of the display panel.

9. The display panel assembly of claim 1, further comprising an electrical connection configured to provide a conduit to electrically connect the display panel to electrical equipment located in the interior of the bag.

10. The display panel assembly of claim 1, further comprising at least one electrical access opening through the bag wherein the electrical access opening is configured to pass electrical wiring from the display panel to the interior of the bag.

11. The display panel assembly of claim 1 wherein the attachment edge is further comprised of a gripping aid, the gripping aid configured to help the attachment edge temporarily adhere to the bag front wall.

12. The display panel assembly of claim 1, further comprised of a computing unit panel attached to the inside surface of the front wall.

13. The display panel assembly of claim 12, further comprising a mounting structure on the inside surface of the bag front wall, the mounting structure configured to removably attach the computing unit panel to the inside surface of the bag front wall.

14. The display panel assembly of claim 12, further comprised of an electrical connection between the display panel and the computing unit panel.

15. A display panel assembly comprising:
   a. a bag comprised of an interior and a front wall including an outside surface and an inside surface;
   b. a display panel comprising a front side including a display, a back side and an attachment edge;
   c. a pivoting computer equipment mount connecting the display panel to the bag and comprised of a free section; and
   d. an extension on the attachment edge of the display panel wherein the extension is configured to abut the bag front wall while the free section suspends the display panel from the bag and hold the display panel at an angle relative to the bag front wall.

16. The display panel assembly of claim 15 wherein the free section is comprised of a flexible fabric attachment flap.

17. The display panel assembly of claim 15 wherein the free section is rigid and is further comprised of a first pivoting attachment connecting the free section to the bag and a second pivoting attachment attaching the free section to the display panel.

18. The display panel assembly of claim 15 wherein an angle between a plane of the extension and a plane of the display panel may be fixed at a useful angle.

19. The display panel assembly of claim 15 wherein the extension is further comprised of a gripping feature to help the extension temporarily adhere to the bag front wall.

20. The display panel assembly of claim 15 wherein the extension is further comprised of a prop holder, the prop holder matching a prop located between the display panel and the bag front wall and supporting the display panel in an angular position relative to the front wall of the bag.

21. The display panel assembly of claim 15 wherein the bag front wall is further comprised of a contact surface configured to aid in temporarily adhering the extension to the bag front wall.

22. The display panel assembly of claim 15 wherein the display panel is further comprised of camera.

23. The display panel assembly of claim 15 wherein the display panel is further comprised of a control.

24. The display panel assembly of claim 23 wherein the control is one of a touch screen on the display and a control located on the back side of the display panel.

25. The display panel assembly of claim 15, further comprising an electrical connection configured to provide a conduit to electrically connect the display panel to electrical equipment located in the interior of the bag.

26. The display panel assembly of claim 15, further comprising at least one electrical access opening through the bag wherein the electrical access opening is configured to pass electrical wiring from the display panel to the interior of the bag.

27. The display panel assembly of claim 26, wherein the free section is an attachment flap constructed of two layers of material and a through opening passes between the two layers and is aligned with the access opening through the bag.

28. The display panel assembly of claim 15, further comprised of a computing unit panel attached to the inside surface of the front wall.

29. The display panel assembly of claim 28, further comprising a mounting structure on the inside surface of the bag front wall, the mounting structure configured to removably attach the computing unit panel to the inside surface of the bag front wall.

30. The display panel assembly of claim 28, further comprised of an electrical connection between the display panel and the computing unit panel.

31. A display apparatus for pivotally mounting and operating on a bag front wall, the display apparatus comprising:
   a. a display panel comprising a front side, a back side and an attachment edge;
   b. a display on the front side of the display panel;
   c. one or more attachments on or near the attachment edge of the display panel to removably attach the display panel to a distal section of an attachment flap of the bag and pivot around the attachment edge; and
   d. an extension extending from the display panel attachment edge, the extension configured to abut the bag while a free section of the attachment flap suspends the display panel from the bag and hold the display panel at an angle relative to the bag front wall.

32. The display apparatus of claim 31 wherein the display panel attachment is a clamp.

33. The display apparatus of claim 31 wherein an angle between a plane of the extension and a plane of the display panel may be fixed at a useful angle.

34. The display apparatus of claim 31 wherein the extension is further comprised of a gripping feature to help the extension temporarily adhere to the bag front wall.

35. The display apparatus of claim 31 wherein the extension is further comprised of a prop holder, the prop holder matching a prop located between the display panel and the bag front wall and supporting the display panel in an angular position relative to the bag front wall.

36. The display apparatus of claim 31 wherein the display panel is further comprised of camera.

37. The display apparatus of claim 31 wherein the display panel is further comprised of a control.

38. The display apparatus of claim 37 wherein the control is one of a touch screen on the display and a control located on the back side of the display panel.

39. The display apparatus of claim 31, further comprising an electrical connection configured to provide a conduit to electrically connect the display panel to electrical equipment located in an interior of the bag.

* * * * *